United States Patent [19]
Plunkett

[11] 4,075,538
[45] Feb. 21, 1978

[54] ADAPTIVE ACCELERATION RESPONSIVE SYSTEM

[75] Inventor: Allan Barr Plunkett, Erie, Pa.
[73] Assignee: General Electric Company, Erie, Pa.
[21] Appl. No.: 687,832
[22] Filed: May 19, 1976
[51] Int. Cl.² ............................................. H02P 5/06
[52] U.S. Cl. ........................................ 318/52; 318/72; 180/82 R
[58] Field of Search ............................ 318/52, 71, 72; 180/82 R

[56] References Cited

U.S. PATENT DOCUMENTS

| | | | |
|---|---|---|---|
| 3,541,406 | 11/1970 | Etienne | 318/52 |
| 3,614,564 | 10/1971 | Hirotsu | 318/52 |
| 3,728,596 | 4/1973 | Hermansson et al. | 318/52 |
| 3,912,034 | 10/1975 | Palloff | 318/52 X |

*Primary Examiner*—B. Dobeck
*Attorney, Agent, or Firm*—J. H. Beusse

[57] ABSTRACT

A method and apparatus for rapidly detecting acceleration variations in a moving object by monitoring the instantaneous velocity of the object. A signal representative of instantaneous velocity is operated on to derive signals representative of average acceleration, instantaneous acceleration and predicted velocity. The average acceleration and instantaneous acceleration signals are compared to determine acceleration changes. In a preferred embodiment the invention is applied as a wheel slip/slide detector in a traction vehicle and a signal generated when the instantaneous acceleration deviates from the average acceleration by a predetermined magnitude is utilized as a wheel slip/slide signal to implement corrective action to the power control system of the vehicle. Upon generation of the wheel slip/slide signal, calculation of average acceleration is inhibited to prevent its influence by the sudden acceleration change. The predicted velocity signal, which is dependent upon the average acceleration signal, is compared with the instantaneous velocity signal to determine when the vehicle has recovered from the wheel slip/slide condition.

22 Claims, 7 Drawing Figures

ADAPTIVE ACCELERATION RESPONSIVE SYSTEM

BACKGROUND OF THE INVENTION

The present invention relates to a method and apparatus for detecting changes in acceleration of a moving object and, more particularly, to such a method and apparatus useful in a wheel slip correction scheme on traction vehicles.

In many applications there is a need to sense a change in acceleration of a moving object. For example, in vehicle drive systems a change in rotational acceleration of a wheel may be indicative of a loss of adhesion between the wheel and a tractive surface along which the wheel is rolling. This change in acceleration may occur either when the wheel is being driven to increase velocity of the vehicle or when the wheel is being braked to thereby decrease vehicle velocity. Braking of a wheel is sometimes referred to as deceleration. For purposes of illustrating the advantages of the present invention, the invention will be described in conjunction with a wheeled vehicle and, more particularly, in conjunction with a control system for an electric traction motor drive system. However, it will be apparent to those skilled in the art that the present invention is adaptable to many other applications.

Traction vehicles, such as locomotives or transit cars, commonly utilize a plurality of individually powered axles. Loss of adhesion, or otherwise stated, a decrease in the coefficient of friction between wheel and rail below that required to maintain a powered wheel in rolling contact with the rail, will result in slipping of the wheel on the rail. Slipping is generally defined as a condition wherein the rotational velocity of the wheel is greater than that velocity required to drive the vehicle at its actual velocity. When one, or all, of the powered wheels of a vehicle slips, there may not be any noticeable loss of tractive efffort to warn the vehicle operator of such slippage until the slip is severe. Uncorrected wheel slips cause loss of vehicle performance and may cause damage to propulsion equipment, vehicle wheels and the rail on which the equipment is operating. Therefore, some automatic means of detecting and correcting wheel slips is highly desirable.

A related problem to wheel slip is wheel slide, which may occur during electrical or mechanical braking of an electrically powered vehicle when the applied braking torque becomes excessive for the degree of adhesion between the wheel and rail. Sliding is generally defined as a condition wherein the rotational velocity of the wheel is less than that velocity corresponding to the actual velocity of the vehicle. Slipping and sliding are similar in that both may occur as a result of excessive torque of the traction motor. Sliding wheels will develop flat spots whereas slipping wheels will tend to become undersized. Persistent recurrence of either slipping or sliding is highly undesirable.

Two types of wheel slipping or sliding are common. In a first type the wheels of one of the individually powered axles of a vehicle may slip or slide. In a second type the wheels of all of the axles may simultaneously slip or slide. The latter type of condition is referred to as a synchronous slip or slide condition. Slipping or sliding of a single axle may be detected by comparing the speed of the individual axle with the speed of other axles. A synchronous slip condition, however is not susceptible to such a method since all the axles will be revolving at the same velocity. One method for detecting a synchronous slip condition is to set a maximum or overspeed limit and a minimum or underspeed limit for the wheels of the electrically propelled vehicle and then to detect when the wheel speed is beyond the limits imposed by this control system. Such a control system is described in U.S. Pat. No. 3,210,630 — Zelina issued Oct. 5, 1965, and assigned to the General Electric Company. One of the difficulties with a system of this nature is, however, that the damage may have already occurred to either the control system, the vehicle or the rails before the system indicates that an overspeed or underspeed condition exists. Furthermore, a slipping or sliding wheel actually has a lower coefficient of friction than a rolling wheel and thus a net loss of tractive effort will occur. A slip-slide detection system would ideally detect the slippage prior to an excessive loss of adhesion.

In propulsion systems in which the driving elements are alternating current (a-c) motors, synchronous slip is generally the only type of slip which the system will experience. In a typical application a separate a-c traction motor is geared to each axle of a vehicle, and the stator windings of all the traction motors on the vehicle are connected in parallel for energization from a single power source such as, for example, an inverter supplying stator excitation of controllable amplitude and frequency. The speed of the a-c motors is a function of the frequency of the a-c power supplied by the inverter. Since all of the motors are excited at the same frequency, the only difference in speed will be that imposed by the slight differential in motor slip between the respective driving motors. The motor slip frequency is normally in the range of one to five cycles which is in the vicinity of 0.5 to 1.5% of maximum speed. The difference in velocity between a non-slipping wheel and a slipping wheel will therefore be negligible. What happens when the wheels on one axle begin to slip or slide is that the associated traction motor tends to unload and the decrement is picked up by the other traction motors which consequently impose increased torque on the non-slipping wheels until they too lose adhesion and begin to slip or slide. Accordingly, in an a-c traction motor drive system, comparison of relative speeds between individually powered axles does not represent an effective method for determining a wheel slip or slide condition.

In some applications the electrically powered vehicle may have only a single drive train. For example, a geared drive to all axles may be used. In a single drive train system comparison of axle speeds is not possible. Most single drive train slip/slide detection systems utilize either an upper and lower wheel speed limit or an upper and lower motor current limit as a condition for detection wheel slip or slide. This type of detection system requires that a limit condition occur before the system can be responsive to the wheel slip or slide. Thus, the damage which can be done by wheel slip or slide may have already occurred before the detection system can react and provide a correction.

Accordingly, it is an object of the present invention to provide a method and apparatus for detecting a change in acceleration of an object without requiring a comparison of the acceleration of that object with acceleration of another object.

It is a further object of the present invention to provide an improved method and apparatus for detecting a wheel slip or a wheel slide condition in a traction vehicle.

It is a still further object of the present invention to provide an improved method and apparatus for detecting a synchronous wheel slip or wheel slide condition in a traction vehicle.

SUMMARY OF THE INVENTION

These and other objects are achieved in a control system which is responsive to a single input signal corresponding to velocity of an object to provide an output signal indicating that a change in acceleration rate has occurred. The control system of the present invention comprises a computation circuit which operates upon an input signal corresponding to the actual velocity of an object to provide a first output signal corresponding to average acceleration and a second output signal corresponding to the predicted velocity of the object. The system also includes a differentiator circuit for operating upon the input signal to derive a signal proportional to the instantaneous acceleration of the object. A comparison circuit compares the instantaneous acceleration with the average acceleration and provides an output signal when the instantaneous acceleration deviates from the average acceleration by a predetermined amount. The output signal from the comparison circuit is applied to a memory circuit which provides a fixed output indicating that a change in acceleration rate has been detected. The output of the memory circuit is also fed back into the computation circuit to interrupt the velocity input signal to thereby prevent the computation circuit from providing an average acceleration output signal based upon the changed velocity. The system further includes apparatus for detecting when the velocity of the object is within a predetermined margin of the predicted velocity and therefore that the acceleration rate has recovered from a transient condition. In particular, this latter apparatus comprises a velocity comparison circuit for comparing the signal corresponding to actual velocity of the object to the signal corresponding to the predicted velocity of the object. The velocity comparison circuit then provides an output signal when the predicted velocity and the actual velocity coincide. This output signal is then applied to a reset terminal of the memory circuit to affect a resetting of memory and thereby allow the computation circuit to again be permitted to operate upon the incoming velocity signal. The system also includes a time delay circuit connected between the output of the first comparison circuit and the reset input terminal of the memory circuit. An AND circuit combines the signals from the time delay circuit and the velocity comparison circuit before applying a combined signal to the reset terminal of the memory circuit. This time delay circuit prevents the memory circuit from being reset by the velocity comparison circuit too rapidly. A too rapid reset may occur, for example, if the comparison circuit comparing the predicted velocity with the actual velocity does not sense that the actual velocity has deviated substantially from the predicted velocity. Thus, the delay circuit provides an inhibit for a fixed time interval to assure that when the signal from the velocity comparison circuit indicates a recovery, an actual recovery has occurred.

In a control system for an electric traction motor propelled vehicle the present invention is connected to monitor an input signal corresponding to wheel velocity. The computation circuit provides a first output signal corresponding to the average acceleration of a wheel and a second output signal corresponding to the predicted velocity of the wheel. If the wheel slips or slides, the deviation between actual acceleration will be detected by the acceleration comparison circuit and will result in a signal being applied to the memory circuit. The memory circuit will then provide a slip signal indicating that a wheel slip or slide has occurred. The slip signal is applied to the computation circuit and interrupts the velocity input so that the output signals developed by the computation circuit track the non-slipping velocity profile.

In a preferred embodiment for an alternating current traction motor control system the slip signal is utilized to interrupt a torque command and to cause the control system to operate the traction motors at a constant motor-slip frequency. This procedure allows the traction motor system to recover from the slipping or sliding condition without the control system calling for increased torque and thus causing the non-slipping or non-sliding wheels to lose adhesion. The slip signal is also utilized to effect a reduction in the torque command signal such that when the wheels have regained adhesion, the initial torque of the motors will not cause a subsequent immediate loss of adhesion. Also, another time delay circuit is provided to reset the memory circuit after a certain time so that a failure to detect recovery by monitoring velocity differences does not lock out the normal vehicle propulsion control.

DESCRIPTION OF THE DRAWINGS

The novel features believed characteristic of this invention are set forth in particularity in the appended claims. The invention itself, however, both as to its organization and method of operation together with further objects and advantages thereof can best be understood by referring to the following description taken in conjunction with the following drawings wherein:

DETAILED DESCRIPTION

Figure 1:
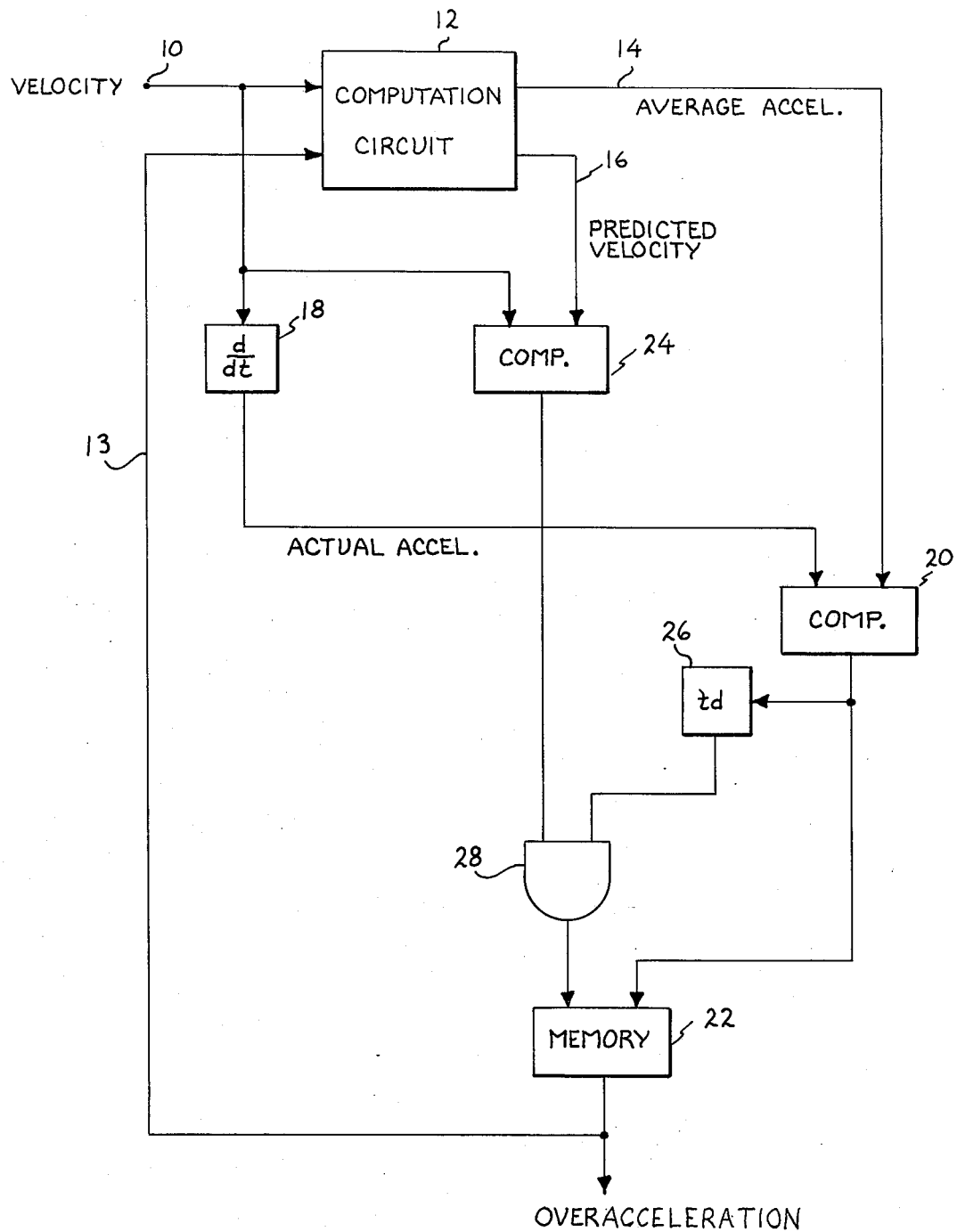
FIG. 1 is a simplified block diagram of a system according to the present invention for abstracting from a velocity input an output signal indicating a change in acceleration.

Referring now to FIG. 1, there is shown a simplfied block diagram of the present invention to which there is provided a single input signal corresponding to the instantaneous velocity of an object. The velocity signal is applied as an input signal at terminal 10 and thus to a computation circuit 12, which computation circuit 12 operates on the incoming velocity signal to derive a first output signal on a line 14 corresponding to the average acceleration of the object and a second output signal on line 16 corresponding to the predicted velocity of the object. The incoming or instantaneous velocity signal is also supplied to an input terminal of a differentiator circuit 18, which differentiator circuit 18 provides an output signal corresponding to the instantaneous acceleration of the object. The output signal from differentiator circuit 18 and the output signal on line 14 are applied to first and second input terminals respectively of a comparison circuit 20. Comparison circuit 20 compares the two signals, one of which is proportional to actual acceleration and the other of which is proportional to average acceleration, and provides an output signal of first logical significance when the magnitude of the actual acceleration signal differs from the magnitude of the average acceleration signal by a predetermined magnitude or margin. An output terminal of comparison circuit 20 is connected to a first input terminal of a memory circuit 22. Memory circuit 22 may comprise, for example, a bi-stable multivibrator which provides an output signal having a first logical significance when an input signal of first logical significance is applied to a "set" input terminal. Hereinafter, a signal of first logical significance will be referred to as a logic 1 signal. Accordingly, memory circuit 22 is triggered by the output signal from comparison circuit 20 to provide an output or overspeed signal indicating that the actual acceleration differs from the average acceleration by a predetermined margin or magnitude. Although referred to hereinafter as an overspeed signal, it will be understood that this output signal may also represent an underspeed condition.

Assuming that the inventive circuit will be utilized in an overall system which responds to the output signal developed by memory circuit 22 to effect a correction in the acceleration or velocity of the object, there is also provided within the inventive circuit a means for determining when the velocity or acceleration of the object has returned to its normal state. In particular, the output signal on line 16, which signal corresponds to the predicted velocity of the object, is applied to a first input terminal of a comparison circuit 24 and the instantaneous or actual velocity signal is applied to a second input terminal of comparison circuit 24. Comparison circuit 24 produces a logic 1 signal when the magnitude of the actual velocity signal is within a predetermined margin of the magnitude of the predicted velocity signal. This logic 1 signal is applied to a second input terminal of memory circuit 22. In the situation wherein memory circuit 22 comprises a bi-stable multivibrator, the second input terminal would correspond to a reset terminal for the multivibrator. Accordingly, when the output signal from comparison circuit 24 goes to a logic 1 level, this signal will effect a reset of memory circuit 22 thereby providing an output signal from memory circuit 22 indicating that the system velocity has recovered to within a predetermined margin or magnitude of its predicted velocity.

Since the system reacts rapidly, there is a possibility that the instantaneous velocity will not have deviated significantly from the predicted velocity at the time that the comparison circuit 20 has determined that the acceleration has exceeded the predetermined limits. Accordingly, the signal developed by comparison circuit 24 is inhibited for a predetermined minimum time before application to the reset terminal of memory circuit 22. This inhibit is provided by a time delay circuit 26 having an input terminal connected to the output terminal of comparison circuit 20 and an output terminal connected to a first input terminal of an AND gate 28. A second input terminal of AND gate 28 is connected to the output terminal of comparison circuit 24 and an output terminal of AND gate 28 is connected to the reset terminal of memory circuit 22. Time delay circuit 26 may comprise, for example, a monostable multivibrator which is triggered when the output signal from comparison circuit 20 goes to a logic 1 state and provides a logic 0 output signal for a predetermined time interval. The logic 0 output signal will inhibit AND gate 28 thus preventing the signal from comparator 24 from traversing the AND gate 28 and being applied to memory circuit 22.

As can be seen, the output signal from memory circuit 22 is also applied as a feedback signal to computation circuit 12 via line 13. This feedback signal serves to open the velocity input loop to computation circuit 12 and prevent the velocity input signal from affecting the output signals from circuit 12. In particular, the input signal to the computation circuit 12 is held at the last value prior to the recognition that the acceleration had exceeded the predetermined limits. This allows the computation loop to continue computing, but at the old rate, i.e., the acceleration output signal on line 14 follows the same acceleration curve as it was following prior to the sudden change in acceleration. In addition, the predicted velocity will also follow the curve that was being followed prior to the sudden change in acceleration and therefore allows the comparison circuit 24 to compare the predicted velocity with the actual velocity to determine when a recovery does occur. The preferred method of realizing the computation circuit is to use the velocity and the first derivative of velocity in the prediction. This results in a constant stored predicted acceleration and a linearly changing predicted velocity. However, higher order derivatives of acceleration could be used to allow prediction of changes in acceleration. Also, a time constant is introduced into the computation circuit so that sudden changes of acceleration will not affect the predicted values of acceleration and velocity.

Figure 2:
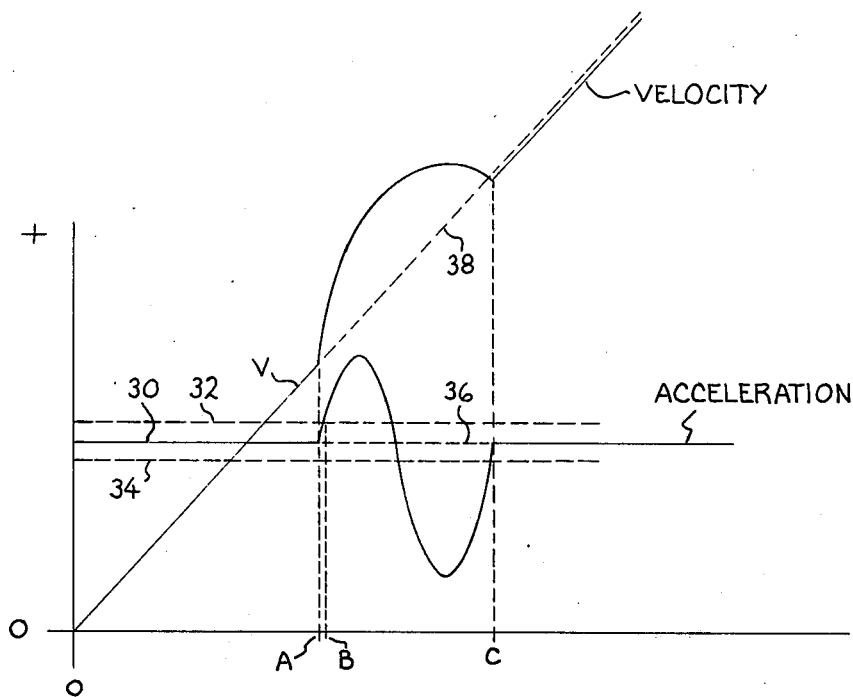
FIG. 2 is a graph illustrating velocity and acceleration curves and an overspeed condition.

For a clearer understanding of the operation of the inventive circuit, reference may be had to FIG. 2 in which there is shown a graph of typical velocity and acceleration curves for an object such as a wheel propelling a vehicle. The horizontal axis represents time and the vertical axis represents the magnitude of both velocity and acceleration. As can be seen, during the period from time 0 until time A the acceleration profile 30 remained within the detection margins indicated by dotted lines 32 and 34. During this same period, the velocity profile V was substantially linear. At time A the instantaneous velocity and the instantaneous acceleration of the wheel changed and at time B the instantaneous acceleration exceeded the detection threshold margin established at line 32. As discussed with reference to FIG. 1, this excursion will result in a signal being produced by comparison circuit 20, which signal will force memory circuit 22 to produce an overacceleration signal. Since the overacceleration signal is directed back to computation circuit 12 to open-circuit the velocity input signal, computation circuit 12 will not respond to the sudden change in wheel velocity.

Still referring to FIG. 2, the average acceleration output signal from computation circuit 12 will follow the profile indicated at 36 since the velocity input signal is interrupted. During this period the predicted velocity output signal will follow the profile indicated at 38 since the predicted velocity is a function of the average acceleration. Assuming apparatus responsive to the overacceleration signal for correcting an overacceleration condition, the actual velocity and actual acceleration will follow substantially the indicated profiles during the period from time B to time C. Thus, in response to the overacceleration signal, power to the shipping wheel is reduced, the acceleration drops off and velocity begins to decrease. When the actual velocity decreases to within a predetermined margin of the predicted velocity as indicated just prior to time C, comparison circuit 24 produces an output signal which effects a reset of memory circuit 22 and removes the overacceleration signal. The circuit then accepts the actual velocity signal and continues operation as before.

Figure 3:
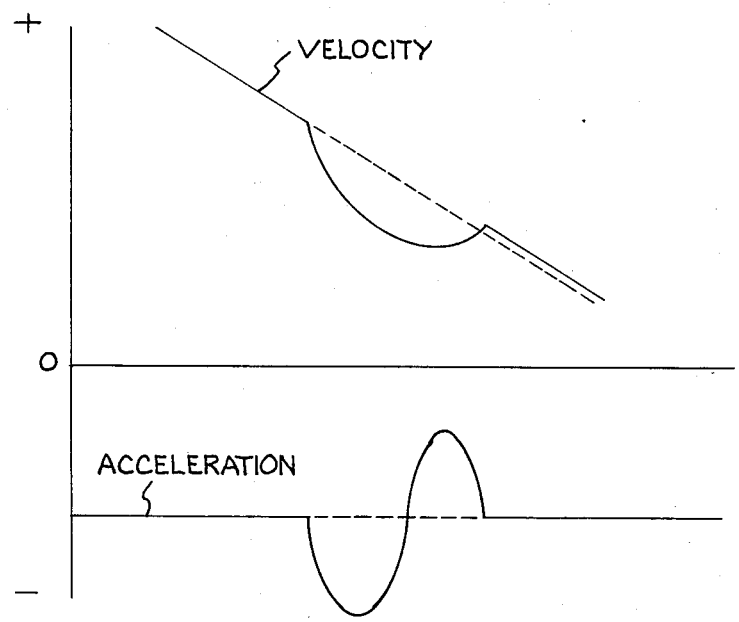
FIG. 3 is a graph illustrating velocity and deceleration curves with an underspeed condition.

The curves illustrated in FIG. 2 are typical of a wheel-slip occurring during propulsion of a vehicle. During braking of a vehicle a similar loss of adhesion will result in wheel slide. FIG. 3 illustrates the velocity and acceleration profiles for a loss of adhesion during braking. As can be seen, the profile of velocity during braking is substantially an inverse of the velocity profile for propulsion. The inventive circuit thus functions in the same manner for wheel slide as was discussed for a wheel slip condition.

Figure 4:
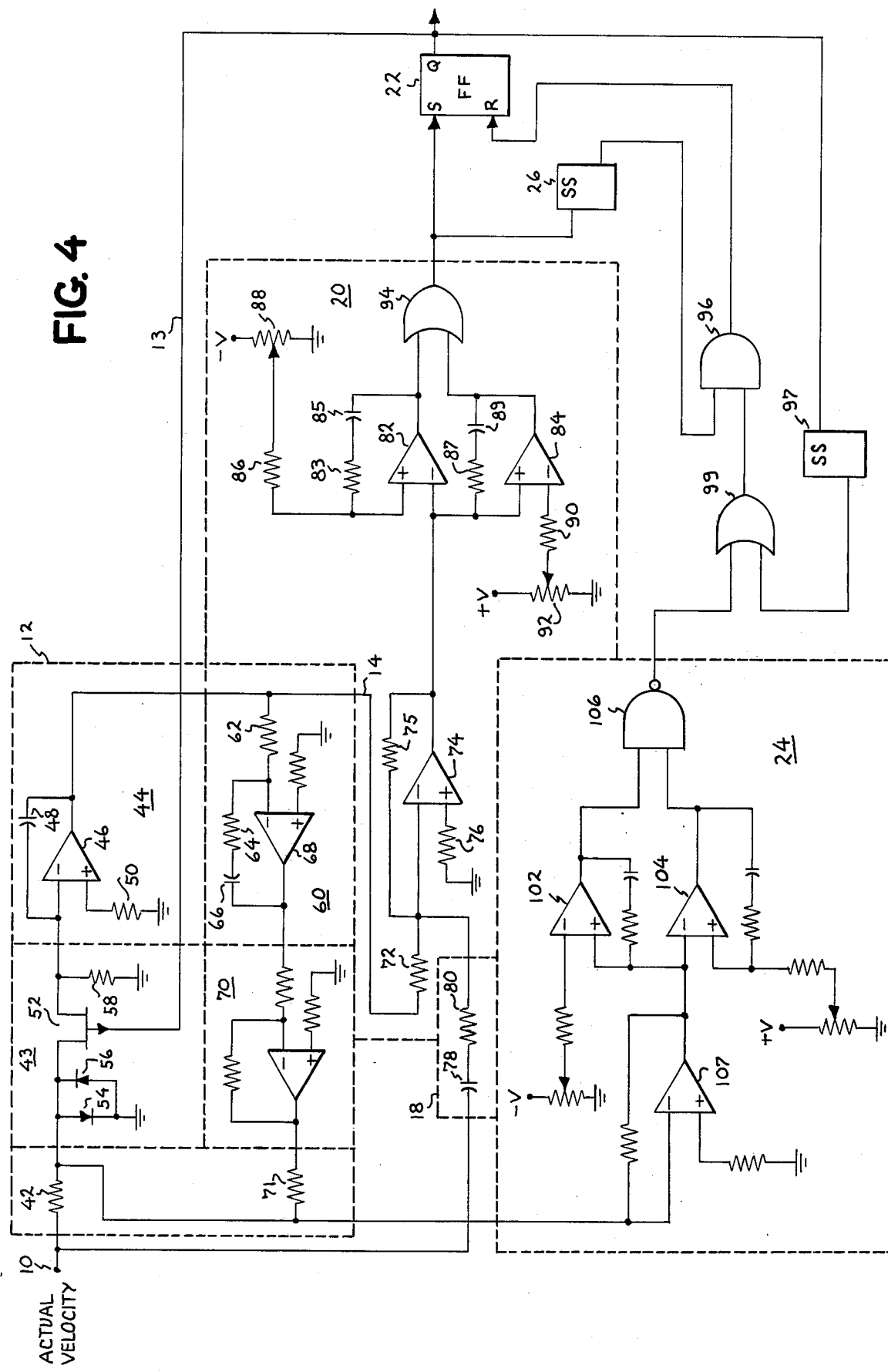
FIG. 4 is a detailed schematic of one embodiment of the present invention.

Referring now to FIG. 4 there is shown a detailed circuit diagram illustrating one embodiment of the inventive apparatus of FIG. 1. Although the embodiment of FIG. 4 is substantially an analog circuit, it is to be understood that the functions of the inventive apparatus of FIG. 1 could be alternatively implemented using digital processing techniques. Computation circuit 12 comprises an input resistor 42 having one end thereof connected to terminal 10 and another end thereof connected through a switch 43 to an inverting input terminal of a first integrating amplifier 44. Integrating amplifier 44 may be of a type well known in the art comprising an operational amplifier 46 and a feedback capacitor 48 connected between an output terminal and the first input terminal of amplifier 46. A second input terminal of amplifier 46 is connected through a resistor 50 to a reference potential or ground. Switch 43 comprises a field effect transistor (FET) 52 having a source terminal connected to resistor 42 and a drain terminal connected to the first input terminal of amplifier 44. Inversely paralleled diodes 54 and 56 are connected between the source terminal of FET 52 and the reference potential in order to limit the voltage applied to FET 52. A current sinking resistor 58 is connected between the drain terminal of FET 52 and the reference potential. FET 52 is operated as a switch to open-circuit the velocity input signal during an overspeed or underspeed condition.

The output terminal of amplifier 44 is connected to a first input terminal of a second integrating amplifier 60 through a resistor 62. With the exception of a frequency compensating resistor 64 serially connected in a feedback path with a capacitor 66, amplifier 60 is substantially identical to amplifier 44 and comprises an operational amplifier 68 and the feedback capacitor 66.

An output terminal of integrating amplifier 60 is connected to an input terminal of an amplifier 70 of a type well known in the art, which amplifier 70 provides a gain adjustment and an inversion of the signal developed by amplifier 60. An output terminal of amplifier 70 is connected through a resistor 71 to the source terminal of FET 52 thus completing the feedback loop for computation circuit 12. As can be appreciated, computation circuit 12 is comprised of a double integrator and since the signal developed at the output terminal of the second integrating amplifier 60 is proportional to velocity, the signal developed at the output terminal of the first integrating amplifier 44 is proportional to average acceleration. The loop is made to be relatively slow so that sudden changes in velocity will not affect the average acceleration signal at the output of amplifier 44 and the average velocity signal at the output of amplifier 60. Since the loop consists of two integrators, there will be zero error between the actual and predicted velocity for a constant rate of change of velocity. The loop will track slow rates of velocity change but will not significantly respond to faster changes caused by wheel slips or slides.

Line 14 connects the output terminal of amplifier 44 to a first input terminal of comparator 20 through an input resistor 72 having one end thereof connected to line 14 and a second end thereof connected to a first input terminal of an amplifier 74, which amplifier 74 includes a feedback resistor 75. A second input terminal of amplifier 74 is connected through a resistor 76 to the reference potential. The velocity input signal at terminal 10 is connected through differentiator circuit 18 also to the first input terminal of amplifier 74. Differentiator circuit 18 comprises a series combination of a capacitor 78 and a resistor 80, which resistor 80 in conjunction with resistor 72 form a summing network for combining the actual acceleration signal from differentiator circuit 18 with the average acceleration signal from amplifier 44. Resistor 80 also provides amplifier stability. Accordingly, a summing junction is formed at the first input terminal of amplifier 74, at which summing junction the difference in magnitude between the actual acceleration signal and the average acceleration signal is developed. A smoothing circuit (not shown) may be used with amplifier 74 to remove noise in the measured velocity signal to prevent false comparisons.

An output terminal of amplifier 74 is connected to a bidirectional comparator comprising first and second comparators 82 and 84. In particular the output terminal of amplifier 74 is connected to the inverting input terminal of comparator 82 and to the noninverting input terminal of comparator 84. The non-inverting input terminal of comparator 82 is connected through a resistor 86 to a variable tap on a potentiometer 88. The inverting input terminal of comparator 84 is connected through a resistor 90 to a variable tap on a potentiometer 92. Potentiometer 88 is connected between a negative reference voltage $-V$ and the reference potential, whereas potentiometer 92 is connected between a positive reference voltage $+V$ and the reference potential. Output terminals of comparators 82 and 84 are connected respectively to first and second input terminals of a logical OR gate 94 whereby a logic 1 signal developed at an output terminal of either comparator 82 or comparator 84 will result in a logic 1 signal being developed at an output terminal of OR gate 94. Resistor-capacitor networks comprising resistor 83-capacitor 85 and resistor 87-capacitor 89 respectively are connected from the non-inverting input terminals to the output terminals of comparators 82 and 84 and provide hysteresis to force the comparators to latch in a changed state rather than to oscillate if the input signal fluctuates. The time constant of the network is kept sufficiently short to prevent adverse effects on the comparison process.

The output terminal of OR gate 94 is connected to an input terminal of time delay circuit 26, illustrated in FIG. 4 as a monostable multivibrator. Circuit 26 is responsive to the leading edge of a positive going or logic 1 signal from OR gate 94 to produce at an output terminal a logic 0 output signal for a predetermined time duration. Such monostable multivibrators are well known in the art. The output terminal of circuit 26 is connected to a first input terminal of an AND gate 96 whereby AND gate 96 is forced to produce a logic 0 signal at an output terminal during the time delay period of circuit 26.

The output terminal of OR gate 94 is also connected to the SET input terminal of an RS flip-flop, which flip-flop corresponds to memory circuit 22. The RESET input terminal of circuit 22 is connected to the output terminal of AND gate 96. A "set" or Q output terminal of circuit 22 provides the overacceleration signal. It is noted that the overacceleration signal is fed back via line 13 from circuit 22 to a gate terminal of FET 52. Thus, when circuit 22 is triggered to a set condition, FET 52 is gated off and interrupts the velocity input signal and the velocity feedback loop to amplifier 44. This action causes amplifier 44 to provide a constant output signal magnitude, i.e., the output signal from amplifier 44 remains at the magnitude attained just prior to FET 52 being gated off. Since this constant magnitude signal is supplied to integrating amplifier 60, amplifier 60 produces a substantially linear ramp output signal corresponding to the predicted velocity of the monitored object under conditions of constant acceleration.

Recovery from an overacceleration condition is detected by comparison circuit 24. As can be seen comparison circuit 24 is substantially identical to comparison circuit 20 and thus a detailed description of the components of circuit 24 is omitted. Of interest, however, is the fact that although in FIG. 1 comparison circuit 24 is illustrated as having two input terminals for receiving signals proportional to actual and predicted velocities, the implementation of FIG. 4 shows only a single input terminal connected to a buffer amplifier 107. This modification is achieved by utilizing as an input signal the difference signal developed at the junction of resistor 42 and resistor 71, which difference signal corresponds to the difference between the magnitude of the actual velocity signal and the magnitude of the predicted velocity signal. Comparison circuit 24 merely compares the difference signal to a predetermined magnitude and provides a logic 1 output signal when the difference is within the predetermined margins or limits set by respective comparators 102 and 104. Since comparison circuit 24 must provide a logic 1 signal when the input difference signal is within a plus or a minus margin of the predetermined magnitude, the output signals from comparators 102 and 104 are combined in a logical NAND gate 106. NAND gate 106 provides a logic 1 output signal only if both input signals are logic 0 signals. The output terminal of NAND gate 106 is connected to a second input terminal of AND gate 96 through an OR gate 99. Thus, when the time delay is established by circuit 26 has expired, a return of the magnitude of the actual velocity signal to within a predetermined margin of the predicted velocity signal will result in a logic 1 signal being applied from circuit 24 to AND gate 96 and a logic 1 signal being applied from AND gate 96 to the RESET (R) terminal of circuit 22. This action will force a reset of circuit 22 and remove the overacceleration signal.

Figure 5:
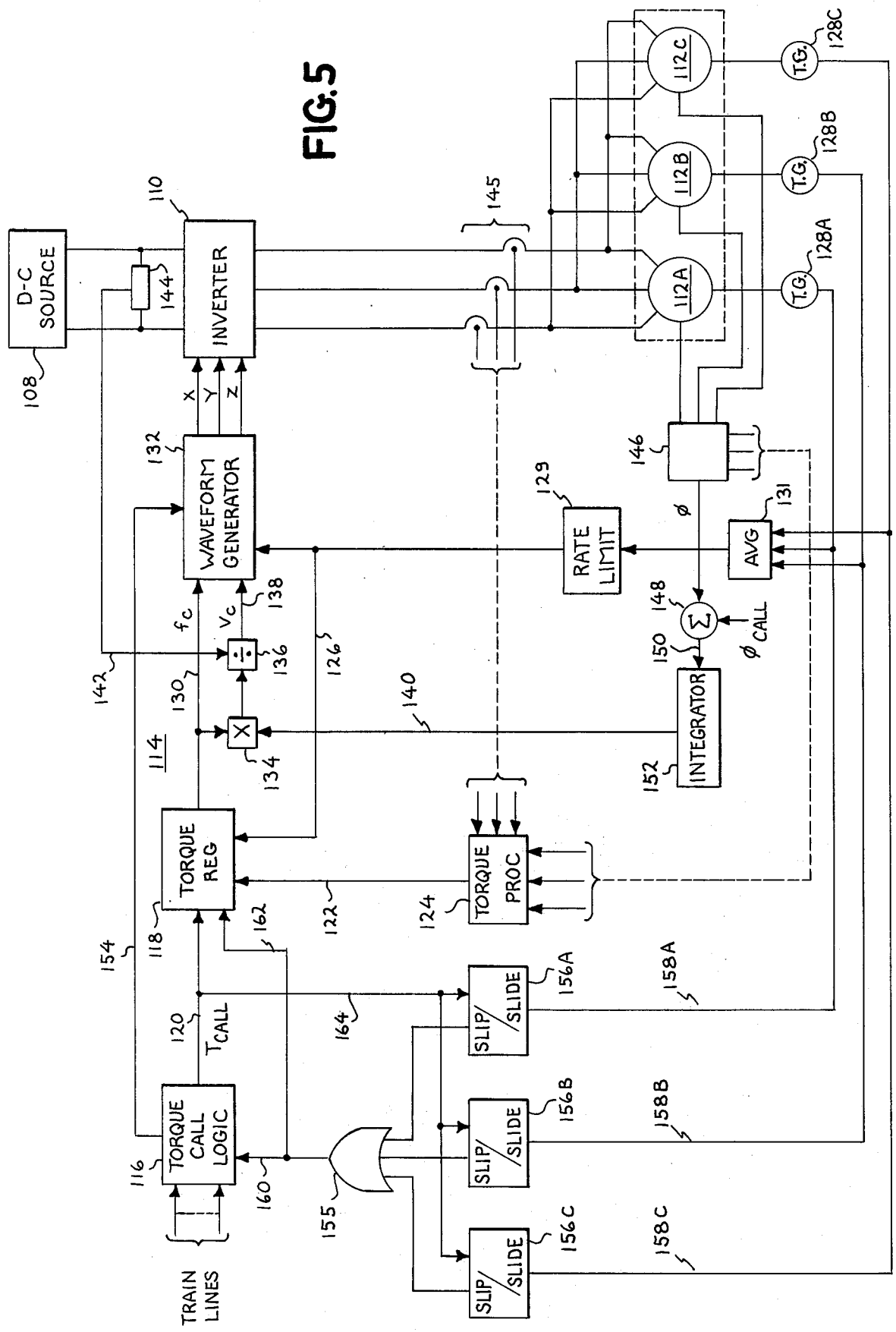
FIG. 5 is a block diagram of an adjustable speed motor drive embodying the present invention.

Referring now to FIG. 5, the present invention is shown in a control system for an adjustable speed motor drive comprising the combination of a suitable d-c electric power source 108, conversion apparatus including an inverter 110 whose power input is taken from that source, and a plurality of adjustable speed a-c motors 112A, 112B, and 112C having 3-phase stator windings which are energized by the output of the inverter 110 and rotors coupled to separate mechanical loads such as the wheels of a traction vehicle (not shown). By appropriately varying the frequency and the amplitude of the excitation that the inverter 110 supplies to the stator windings of the motors 112, the motors can be propelled (motoring mode) or retarded (braking mode) as desired. Toward this end, the electric power conversion apparatus includes suitable means, indicated generally by the reference number 114, for regulating and controlling the operation of the inverter 110 is programmed response to a plurality of input signals comprising a first call signal $T_{CALL}$ representative of the desired motor torque, another call signal $\phi_{CALL}$ representative of the desired value of motor flux, and certain feedback signals representative of the actual responses of selected motor parameters, as is more fully explained below. The $T_{CALL}$ signal is developed by a torque call logic circuit 116 in response to operator command signals generally designated as "Train lines."

The illustrated regulating and control means 114 includes a torque regulator 118 which is fed via line 120 with the aforesaid torque signal $T_{CALL}$, via line 122 with a torque feedback signal representative of the actual valve of torque developed by the motor 112 as derived by a torque processing circuit 124, and via line 126 with a speed feedback signal which is produced by suitable means, such as tachometer generators 128A, 128B, and 128C, for sensing the actual angular velocity of the rotor of the motors 112A, 112B, and 112C, respectively. The speed feedback signal on line 126 is the average of the signals produced by generators 128A, 128B, and 128C as developed by averaging circuit 131, which circuit 131 is of a type well known in the art. In response to these inputs the torque regulator 118 supplies directly to a first input line 130 of a waveform generator 132 a stator frequency command signal $f_C$ which will determine the fundamental frequency of a sequence of periodic control signals on each of three output lines X, Y, and Z. The speed feedback signal is directed through a rate limit circuit 129 before application to generator 132 to prevent an excessive rate of change of wheel speed from being transmitted to the inverter control as is more fully explained in U.S. Pat. No. 3,916,275 - Plunkett et al, issued Oct. 28, 1975, and assigned to the General Electric Company. The control signal sequences on the respective lines X, Y, and Z are generated by the generator 132 in 120-degree staggered patterns to control the operation of firing and commutating means in the inverter 110, thereby enabling the frequency of the fundamental components of the 3-phase alternating voltages that the inverter applies to the terminals of the stator windings of the motor 112 to be varied as a function of the frequency command signal $f_C$.

The frequency command signal $f_C$ from the torque regulator 118 is also supplied to multiplying means 134, which, in cascade with dividing means 136, is coupled to a second input line 138 of the waveform generator 132. In the multiplier 134 the value of the frequency command signal is multiplied by that of an integrated flux error signal on line 140 which is derived from a comparison of actual and desired values of motor flux, and in the divider 136 it is divided by the value of a signal on line 142 which is proportional to the magnitude of the inverter input voltage as sensed by a voltage transducer 144 connected across the d-c input terminals of the inverter 110. Thus the signal appearing on line 138, hereinafter referred to as the amplitude command signal $V_C$, varies directly with the product of the frequency command signal $f_C$ on line 130 and the integrated flux error signal on line 140, and it varies inversely with the inverter input voltage signal on line 142. The waveform generator 132 responds to the amplitude command signal by controlling the operation of the inverter firing and commutating means so as to vary, as a function of $V_C$, the amplitude of the fundamental components of the 3-phase alternating voltages that the inverter applies to the stator terminals of the motors 112. As a result, so long as the amplitude of the fundamental stator excitation voltage is under its maximum possible level and the actual value of motor flux is equal to a constant desired value, this amplitude will track the fundamental excitation frequency so as to maintain the volts-per-hertz ratio of the excitation voltage substantially constant.

The torque regulator 118 causes the frequency command signal $f_C$ to differ from the actual speed feedback signal in an amount and in a sense (which difference represents motor slip frequency) that minimizes any error between the motor torque feedback signal on line 122 and the torque call signal on line 120. The torque feedback signal is obtained from the aforesaid torque processing circuit 124 which preferably is constructed and arranged in accordance with the teachings of my co-pending U.S. patent application Ser. No. 568,120, filed on Apr. 14, 1975, and assigned to the General Electric Company. As is therein explained more fully, this component relies on stator excitation current feedback signals derived from an array of three current transformers 145 coupled to the respective conductors over which the inverter output is supplied to the stator terminals of the motors 112, and it also relies on motor flux feedback signals derived from suitable means 146 for sensing the actual magnetic flux across the rotor-stator air gap inside each of the motors. The latter flux sensing means 146 is advantageously constructed in accordance with the teachings of a co-pending U.S. patent application Ser. No. 525,613 Plunkett et al, filed on Nov. 20, 1974, and assigned to the General Electric Company.

The flux sensing means 146 is arranged to produce a feedback signal $\phi$ representative of the average value of actual motor flux, and this signal is supplied to a summing circuit 148 along with the fluxcall signal $\phi_{CALL}$. The summing circuit 148 derives on line 150 a flux error signal which depends on the difference, if any, between the actual and desired values of motor flux. As is more fully explained in the above-cited co-pending application Ser. No. 525,613 - Plunkett et al, the flux error signal on line 150 is integrated by an integrator 152, and the integrated error signal is supplied via line 140 to the multiplier 134. Consequently, the above-mentioned amplitude command signal $V_C$ on line 138 is increased or decreased in response to an error between actual and desired values of motor flux in order to change the fundamental amplitude of the stator excitation voltage as necessary to reduce the error to zero. The cross-connection of the frequency command signal $f_C$ from the frequency-control, torque regulating loop into the amplitude-control, flux regulating loop through the medium of the multiplier 134 greatly improves the stability of the motor control, especially during the braking mode of operation, and enables the amplitude-control channel to compensate for rapid speed changes without requiring fast control action in the flux regulating loop.

The direction of rotation of the a-c motors 112 depends on the phase sequence of the 3-phase alternating voltages which the inverter 110 applies to their stator terminals, which phase sequence corresponds to the sequencing of the control signal trains on the lines X, Y, and Z from the waveform generator 132. To determine this sequence, a third input line 154 of the generator 132 is supplied with a forward-reverse command signal F/R from torque logic circuit 116. The generator is arranged to reverse the sequence from X-Y-Z to X-Z-Y in response to a commanded change from forward to reverse, and vice versa. A more detailed description of the above-described elements of a motor control system may be had by reference to my co-pending applications Ser. No. 568,120 filed Apr. 14, 1975 and Ser. No. 654,951 filed Mar. 8, 1976 and assigned to the General Electric Co.

The present invention is incorporated in the system of FIG. 5 in the form of a plurality of wheel slip/slide circuits 156A, 156B and 156C. A velocity input signal is provided from tachometer-generators 128A, 128B, and 128C via lines 158A, 158B, and 158C respectively, to corresponding circuits 156A, 156B, and 156C. An overacceleration or wheel slip/slide signal produced by one or all of the wheel slip/slide circuits 156 is connected via OR gate 155 and lines 160 and 162 to logic circuit 116 and torque regulator 118. The wheel slip/slide signal effects a reduction in the $T_{CALL}$ signal produced by logic circuit 116 in order to minimize the possibility of a subsequent wheel slip/slide as a result of full torque being suddenly reapplied to motor 112. The wheel slip/slide signal to torque regulator 118 is utilized to open the torque feedback loop to thereby prevent a synchronous slip/slide condition. An override signal from logic circuit 116 is provided via line 164 to wheel slip/slide circuits 156 for reasons to be more fully explained with reference to FIG. 6.

Figure 6:
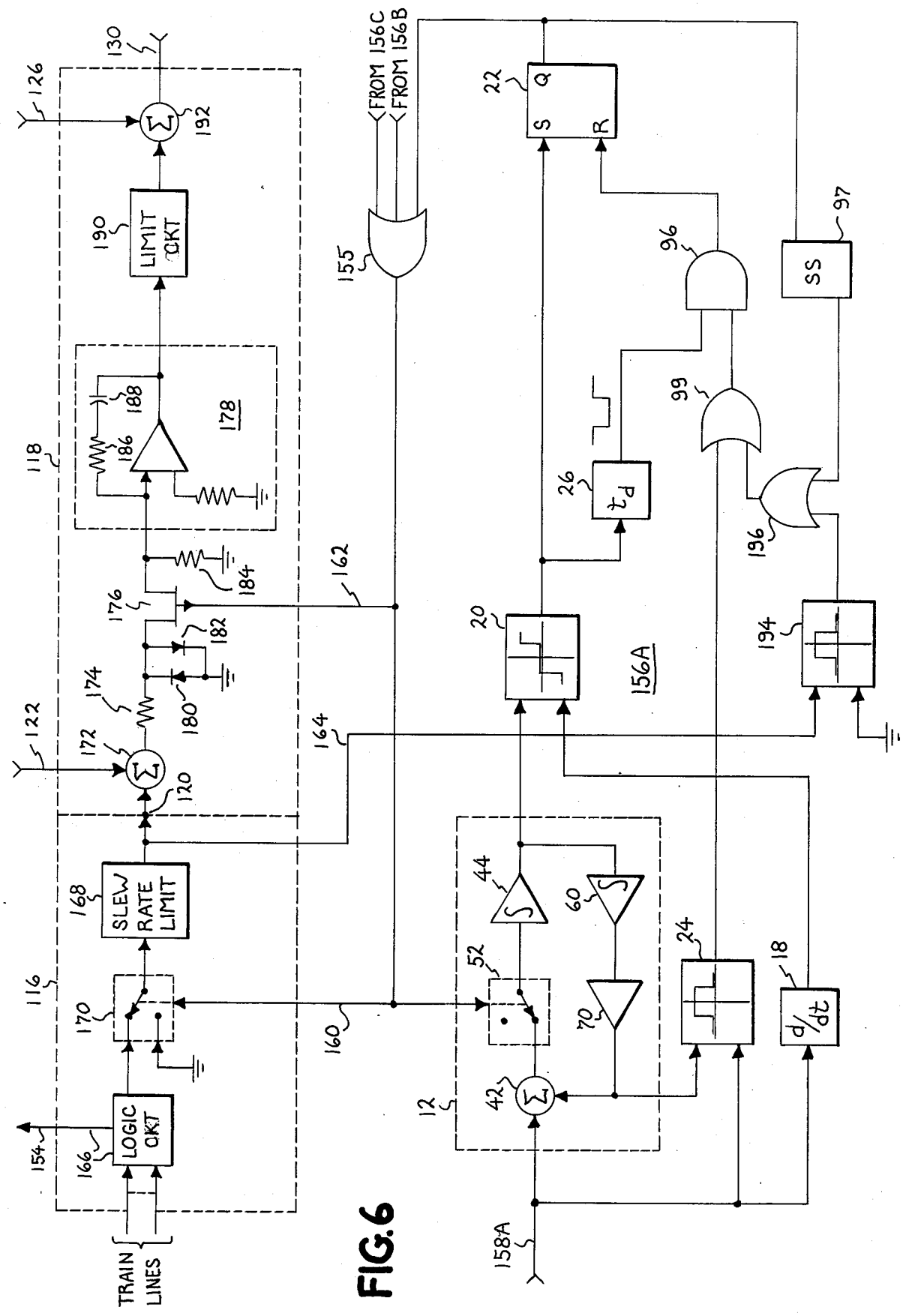
FIG. 6 is a detailed diagram of the present invention arranged for implementation with the system of FIG. 5.

Referring now to FIG. 6 there is shown a detailed diagram of one of the inventive wheel slip/slide circuit 156, in particular circuit 156A, in conjunction with appropriate components of the system of FIG. 5, it being understood that circuits 156B and 156C are identical to 156A. Torque call logic circuit 116 is seen to comprise a logic circuit 166 for converting the train line signals to a corresponding analog command signal for application to a slew rate limit circuit 168 via an analog switch 170. Rate limit circuit 168 is of a tape well known in the art for accepting an analog input signal and providing a corresponding output signal having a predetermined rise time. Switch 170 may be, for example, a type known as an analog bilateral switch manufactured by Radio Corporation of America (RCA) under the part number CD4016. The signal developed at the output of rate limit circuit 168 is the $T_{CALL}$ signal identified previously and is supplied to a first one of the input terminals of a summing circuit 172 in torque regulator 118.

The summing circuit 172 may comprise any conventional, known summing or differential amplifier circuit such as those described in Chapters 1 and 2 of the reference textbook *Operational Amplifiers – Design and Application* by Tobey, Graeme and Huelsman, McGraw-Hill Book Company, 1971. In addition to the commanded torque signal $T_{CALL}$, summing circuit 172 has supplied to a second input terminal an actual torque feedback signal from torque processor circuit 124 on line 122. The input command value of torque signal $T_{CALL}$ is representative of a desired value of torque to be developed by the induction motors 112. Summing circuit 172 combines the command value of torque with the actual value of torque, and derives an output torque error signal representative of the polarity and magnitude of any difference.

The torque error signal is applied through a resistor 174 and a field effect transistor (FET) 176 to a first input terminal of an operational amplifier 178, which amplifier may be a conventional, commercially available, integrated circuit amplifier of the type described in Chapter 8 of the textbook entitled *Operation Amplifiers – Design and Application* by Tobey, Graeme and Huelsman, published by McGraw-Hill Book Company, 1971. It should be noted that the inversely paralleled diodes 180 and 182 connected between a source terminal of FET 176 and the reference potential serve merely to limit the voltage applied to FET 176. Resistor 184 connected between a drain terminal of FET 176 and the reference potential acts as a current sink for FET 176 and amplifier 178. The transfer function designed into operational amplifier 178 is determined primarily by input resistor 174 and feedback elements comprised by resistor 186 and capacitor 188 which are adjusted to provide the operational amplifier 178 with an integral plus proportional transfer characteristic corresponding to the function $[(K_1/S) + K_2]$ as described in the textbook by D'Azzo and Houppis, entitled *Feedback Control System Analysis and Synthesis*, published by McGraw-Hill Book Company, 1960. Thus, it will be appreciated that the operational amplifier 178 operates to derive from the torque error signal a compensated signal which by definition shall be treated as a desired motor slip frequency signal $f_{SLIP}$. The desired slip frequency signal $f_{SLIP}$ obtained at the output of amplifier 178 is supplied through a limit circuit 190, and may then be applied directly to control the operation of the induction motor 112, if such an arrangement be desired. However, it is preferred that the desired slip frequency signal $f_{SLIP}$ be supplied to a second or speed summing circuit 192. Speed summing circuit 192 is similar in construction and characteristics to the summing amplifier circuit 172, and, in addition to the slip frequency signal $f_{SLIP}$, has supplied to it a second input feedback speed signal $f_{SHAFT}$ on line 126 derived from tachometer-generators 128. The feedback speed signal $f_{SHAFT}$ is representative of the average of the actual speeds of the induction motor rotor shafts measured in Hertz.

Summing circuit 192 sums together the slip frequency and actual speed feedback signals and derives at its output a speed control signal $f_C$ which is representative of a desired or commanded value of stator excitation current frequency. The commanded stator frequency control signal $f_C$ is supplied as the frequency controlling input signal to wave form generator circuit 132.

Figure 7:
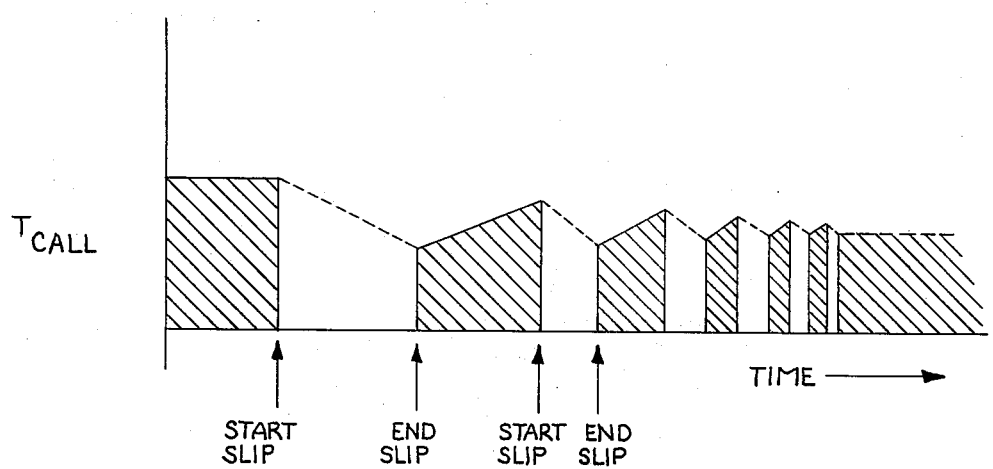
FIG. 7 is a diagram illustrating the action of the recovery circuit following a relatively severe slip.

In addition to the functions previously ascribed to the inventive circuit 156, certain other features are implemented to provide an improved combination in a wheel slip/slide application. In particular, the overacceleration signal developed at the Q output terminal of circuit 22 is applied to switch 170 to effect a removal of the torque command signal from rate limit circuit 168 and to substitute therefore a zero torque command or ground input signal to limit circuit 168. This action forces rate limit circuit 168 to slew the $T_{CALL}$ output signal toward a zero torque command. Since the severity of the wheel slip/slide condition will determine how rapidly a recovery is effected, it can be seen that the degree to which $T_{CALL}$ is reduced is directly related to the severity of the wheel slip/slide. A clearer understanding of this concept may be had by reference to FIG. 7 wherein the shaded areas represent those periods in which torque is controlled and the unshaded areas represent wheel slip/slide intervals. The graph plots the $T_{CALL}$ signal appearing at terminal 120 as a function of time. As is shown, the system "hunts" for that value of applied torque which will result in a minimum wheel slip/slide condition. In that sense the system is adaptive to the characteristics of adhesion to provide a maximum acceleration or maximum braking tractive effort.

Although the reduction in torque command or $T_{CALL}$ signal when applied to summing circuit 172 would effect a reduction in the torque of motor 112, it has been found advantageous to provide an even more rapid reduction of torque command to motor 112. Referring again to FIG. 6, it can be seen that this rapid reduction is accomplished by applying the overacceleration signal from circuit 22 to the gate terminal of FET 176 thereby interrupting the torque error signal at the input terminal of amplifier 178. Interruption of the torque error signal latches the output signal of amplifier 178 at its last value of commanded motor slip. Since the signal from amplifier 178 is a motor slip command ($f_{SLIP}$) and the signal on line 126 is a rate limited (by rate limit circuit 129) shaft frequency signal, the control system operates in a constant motor slip frequency mode except for the slipping motor, rather than a constant torque mode during a wheel slip/slide condition. Thus, the torque command is interrupted and the operation in a constant motor slip frequency mode allows the slipping or sliding one of the motors 112A, 112B, or 112C to unload and recover from the wheel slip/slide condition using the natural induction motor torque-speed characteristics. It is noted that for a plural motor system of the type shown wherein the shaft frequency (velocity) feedback signals are averaged, rate limit circuit 129 may be eliminated. The rate limit circuit 129 merely prevents the shaft frequency feedback signal from changing suddenly when a wheel slip or slide occurs, a function which the averaging circuit 131 inherently provides by reducing the relative impact which a change in one shaft frequency signal will have on the average output signal. However, either the averaging circuit 131 or the rate limit circuit 129 must be included in order to prevent the total motor torque from remaining contant when shaft frequency increases as a result of the shaft frequency feedback signal being summed with the commanded slip frequency signal in summing junction 192.

Although the inventive circuit 156 as previously described will detect a recovery from a wheel slip/slide condition, in some instances the $T_{CALL}$ signal from rate limit circuit 168 will reach a zero torque command level before a recovery is detected. Under this condition it has been found advantageous to override the wheel slip/slide circuit 156 and allow the command torque signal or $T_{CALL}$ signal to be reapplied to motor 112 before recovery of wheel slip/slide is detected. Accordingly, the $T_{CALL}$ signal at the output of limit circuit 168 is applied via line 164 to a first input terminal of a bilateral comparison circuit 194, which circuit 194 is identical to comparison circuit 24. Comparison circuit 194 compares the magnitude of the $T_{CALL}$ signal to the reference potential and provides a logic 1 output signal when $T_{CALL}$ is within a predetermined margin of the reference potential.

An output terminal of comparison circuit 194 is connected to a first input terminal of an OR gate 196. A second input terminal of OR gate 196 is connected to receive a delayed signal from an output terminal of delay circuit 97, which delay circuit 97 has an input terminal connected to receive the output signal memory circuit 22. As indicated previously, circuit 97 is provided as a back-up or fail-safe circuit and may be advantageously omitted, in which event OR gate 196 may be similarly omitted. However, delay circuit 97 is provided to assure a reset of the memory circuit 22 in the event that both comparison circuits 24 and 194 fail to detect a condition for reset. In the alternative, comparison circuit 194 may be omitted and delay circuit 97 included to thereby effect a forced override of the overacceleration signal after a predetermined time delay.

An output terminal of OR gate 196 is connected to a first input terminal of OR gate 99, a second input terminal of OR gate 99 being connected to the output terminal of comparison circuit 24. OR gate 99 in conjunction with OR gate 196 serves to combine the three previously described means for resetting circuit 22 when it is appropriate to remove the overspeed signal.

The invention can better be understood by considering the typical operation of the circuit of FIG. 6. The "Train line" command signals are typically supplied as a parallel digital word calling for a particular motor current or motor torque and a direction of travel. These Train line signals are converted by logic circuit 166 to an analog power call signal which, in the present example, is a torque call signal, $T_{CALL}$. A forward/reverse direction signal is also produced by logic circuit 166 and supplied via line 154 to waveform generator 132 to thereby control the phase relationships between the X, Y, Z signals which signals in turn control the direction of rotation of the stator fields in motors 112.

The $T_{CALL}$ signal is applied via switch 170 to slew rate control circut 168. Slew rate control circuit 168 functions to control the rate of change of the $T_{CALL}$ signal to prevent sudden applications of power to the motors 112. From circuit 168 the $T_{CALL}$ signal is applied to summing junction 172 where it is summed with the actual torque feedback signal to produce a torque error signal. The torque error signal is then applied through FET switch 176 to amplifier 178, which amplifier modifies the error signal to make it conform to a motor slip frequency command signal, $f_{SLIP}$. The $f_{SLIP}$ signal is then conducted via limit circuit 190 to summing junction 192. Limit circuit 190 serves to limit the maximum motor slip which can be commanded. In junction 192 the $f_{SLIP}$ signal is summed with the actual motor rotational frequency signal to produce a motor stator frequency command signal which latter signal is then applied to control the frequency of the a-c power applied to the motors 112.

The wheel slip/slide circuits 156 are connected to receive velocity feedback signals, which signals are supplied by tachometer generators 128 and are directly proportional to the instantaneous velocity of the wheels being driven by the motors 112. As explained previously each wheel slip/slide circuit computates from its respective velocity input signal both the average and instantaneous accelerations of the corresponding driven wheel. So long as any change in the velocity input signals stays within the time constants of the computation circuit, the computed average acceleration will follow, without appreciable error, the instantaneous acceleration of the driven wheel and the slip/slide circuit will remain passive. However, a sudden change in the magnitude of the velocity feedback signal caused by, for example, a reduction in adhesion between the driven wheel and a rail and resulting in a wheel slip or slide, will be detected by the corresponding circuit 156 as a change in acceleration. Accordingly, the circuit 156A, 156B, or 156C will produce a logic 1 output signal, which signal is applied via OR gate 155 to the gate electrode of FET 176 thereby interrupting the torque error signal at the input of amplifier 178. At the same time the circuit 156 output signal is applied via line 160 to switch 170 thereby tying the input terminal of slew rate limit circuit 168 to the reference potential and causing the $T_{CALL}$ signal at the output of circuit 168 to slew toward the reference potential at a controlled rate.

With the torque error path between junction 172 and amplifier 178 open-circuited, the magnitude of the signal at the input of amplifier 178 is held at substantially the magnitude existing at the time switch 176 was opened. Thus the $f_{SLIP}$ signal at the output terminal of amplifier 178 is held constant and the motors 112 are operated at a constant motor slip frequency rater than in a controlled torque mode. This action is particularly useful when, as is shown, the motors 112 actually represent a plurality of motors 112A, 112B, and 112C supplied by the same power source, since operation in a constant slip frequency mode will allow the motors driving the slipping or sliding wheel to unload without transferring the torque load of that motor to the remaining motors. Therefore, since the torque applied to the wheels is not increased, there is less tendency for a non-slipping or non-sliding wheel to lose adhesion.

Assuming that the wheels regain adhesion before either time delay circuit 97 times out or the output signal from circuit 168 approaches the reference level, comparator 24 will detect that actual wheel velocity is within the predetermined margin of the predicted wheel velocity and will reset memory circuit 22. The overacceleration signal (or wheel slip/slide signal) will thus be removed from FET 176 and switch 170. The $T_{CALL}$ signal will therefore be reapplied to the input terminal of slew rate limit circuit 168 and the output signal from circuit 168 will begin to slew toward the magnitude of $T_{CALL}$ starting at the magnitude attained at the time the overacceleration signal was terminated. Accordingly, a torque command signal of a magnitude less than that existing at the time the wheel slip/slide condition occurred will be applied to junction 172 and the resultant error signal applied to amplifier 178 thereby returning the power control system to a controlled torque mode.

Had the $T_{CALL}$ signal from circuit 168 reaches a magnitude within the predetermined margin of the reference potential before a recovery was detected, comparator 194 would have changed state and applied a signal to force a reset of memory circuit 22. Since the reference potential is selected to represent a zero torque command signal, the power control system would, in effect, begin applying power to the motors 112 starting from zero torque and slewing toward the command torque level.

The time delay of circuit 97 may be selected to be at least as large as the time required for rate limit circuit 168 to slew over its entire range. Circuit 97 thus is provided as a fail-safe or back-up circuit in the event a malfunction occurs in the detection circuits. A typical time delay for circuit 97 would be in the order of ¾ to 1½ seconds.

From the above description of the operation of the wheel slip/slide circuit 156 in conjunction with a power control system for controlling motor torque, it can be seen that the combined systems will operate to cause motor torque to reach a level (within the commanded torque level) at which minimum wheel slipping or sliding occurs, or, in other words, a level at which maximum tractive effort is achieved. It can also be seen that the sensitivity of the wheel slip/slide circuit 156 is independent of the velocity or accelertion of the wheels, i.e., the magnitude of the predetermined margins are maintained constant on either side of the actual velocity and acceleration of the wheels.

As will be appreciated the present invention provides a novel means for detecting the initiation of and a recovery from an overacceleration condition. Further, the inventive system has been shown to be adaptive to different rates of acceleration or deceleration by providing detection limits which bracket these rates. When applied to a traction motor control system, the present invention advantageously provides a means for detecting a wheel slip or wheel slide condition and for detecting a recovery from a wheel slip or wheel slide condition. The present invention in combination with the disclosed torque control logic provides an adaptive control system for maximizing tractive effort of an electric vehicle. The invention has been shown to provide an improved wheel slip/slide control system which is capable of detecting synchronous slips/slides and does not rely upon speed comparison between different wheels to detect a slip/slide condition.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What I claim as new and desire to secure by Letters Patent of the United States is:

1. A system for detecting a change in acceleration of a moving object, which change exceeds a predetermined margin, said system comprising:
   a. means for sensing the instantaneous velocity of said object and for developing a first signal representative of said velocity;
   b. computation means connected to receive said first signal, said computation means being operable upon said first signal to produce a second signal representative of the average acceleration of said object and to produce a third signal representative of a predicted velocity of said object;
   c. differentiator means connected to receive said first signal and responsive thereto to produce a fourth signal representative of the actual acceleration of said object; and
   d. first comparison means connected to receive said second and fourth signals, said first comparison means providing a fifth signal when said fourth signal differs from said second signal by at least a predetermined acceleration margin.

2. The system as defined in claim 1 and including:
   e. second comparison means connected to receive said first and third signals, said second comparison means providing a sixth signal so long as said first signal does not differ from said third signal by more than a predetermined velocity margin.

3. The system as defined in claim 2 and including:
   f. means responsive to said fifth signal for inhibiting operation of said computation means and thereby maintaining said second signal constant for the duration of said fifth signal.

4. The system as defined in claim 3 and including:
   g. means for inhibiting said sixth signal for a predetermined time interval after production of said fifth signal.

5. The system as defined in claim 4 wherein said object comprises a roatating wheel in rolling engagement with a tractive surface and said first signal represents the instantaneous rotational velocity of said wheel.

6. In a traction vehicle having at least one wheel thereof connected to be driven by an electric traction motor and including a power control system responsive to a commanded power level signal in a normal operational mode to regulate the power of the motor to the commanded power level, an improved wheel slip control system comprising the system as set forth in claim 5 wherein said fifth signal is coupled to said power control system to modify selected parameters of said power control system and wherein said sixth signal is coupled to said power control system to thereby restore said power control system to its normal operational state.

7. In a traction vehicle having at least one wheel thereof connected to be powered by an electric traction motor and including a power control system responsive to a commanded power level signal in a normal operational state to regulate the power output of the motor to the commanded power level, an improved wheel slip control system comprising a wheel slip circuit connected to monitor the instantaneous rotational velocity of the driven wheel, said wheel slip circuit deriving a plurality of control signals respectively indicative of instantaneous rotational acceleration, average rotational acceleration, and predicted rotational velocity of the powered wheel, said wheel slip circuit being connected to modify selected parameters of the power control system through application of a wheel slip signal to the power control system when said control signals indicate that the instantaneous acceleration deviates from the average acceleration by at least a predetermined acceleration margin, and said wheel slip circuit being effective to restore the power control system to its normal operational state in response to said control signals indicating that the instantaneously velocity of the powered wheel is within a predetermined velocity margin of the predicted velocity.

8. The system as defined in claim 6 wherein said wheel slip circuit is inhibited from restoring the power control system to its normal operational state for at least a predetermined time interval.

9. The system as defined in claim 8 wherein the motor is an alternating current induction motor and the power control system comprises:
   a. power converter means connected to supply alternating current excitation to the motor;
   b. feedback means connected to monitor selected parameters to the motor and to provide a feedback signal representative of the power output of the motor; and c. regulating means connected to control the power converter means in a normal operational state in a manner tending to minimize any difference between the commanded power signal and the feedback signal, said regulating means being connected to said wheel slip circuit whereby said regulating means is responsive to said wheel slip signal to control the motor in a constant motor slip frequency mode when the instantaneous acceleration of the powered wheel deviates from the average acceleration by said predetermined acceleration margin.

10. The system as defined in claim 9 wherein the regulator includes:
   a. a first summing junction for summing the commanded power level signal with the feedback signal to produce an error signal;
   b. amplifying means for deriving from the error signal a motor slip frequency command signal;
   c. a second summing junction for summing the motor slip frequency command signal with a signal proportional to motor armature rotational velocity to thereby produce a stator frequency control signal for controlling the power converter means; and
   d. first switch means coupling the error signal to the amplifying means, said first switch means being connected to said wheel slip circuit and being responsive to said wheel slip signal for interrupting said error signal when the instantaneous acceleration deviates from said average acceleration by at least said predetermined acceleration margin.

11. The system as defined in claim 10 wherein the commanded power level signal is a torque call signal and the feedback signal is an actuator motor torque signal.

12. The system as defined in claim 11 and including a torque call logic circuit for generating said torque call signal as a function of a variable motor torque command signal, said torque call logic circuit comprising:
   a. a first circuit for producing a first signal that is a predetermined function of the motor torque command signal;
   b. a second circuit for producing said torque call signal in accordance with the steady-state value of an input signal, said second circuit including means for limiting variations of said torque call signal to a predetermined rate in response to relatively rapid variations of said input signal; and
   c. second switch means having a normal first state for coupling said first signal to an input terminal of said second circuit and a second state for coupling a reference signal to said input terminal of said second circuit, said second switch means being connected to said wheel slip circuit and being responsive to said wheel slip signal for switching from said first state to said second state when the instantaneous rotational acceleration of the wheel deviates from the average rotational acceleration by at least said predetermined acceleration margin.

13. The system as defined in claim 12 wherein said second switch means is returned to said normal first state upon termination of said wheel slip signal when said instantaneous rotational velocity of the powered wheel is within a predetermined velocity margin of said predicted velocity.

14. The system as defined in claim 13 wherein said torque call signal is coupled to said wheel slip circuit, said wheel slip circuit including means for comparing said torque call signal and said reference signal and means for resetting said wheel slip circuit, thereby terminating said wheel slip signal, when said torque call signal attains a value differing from said reference signal by less than a predetermined amount.

15. The system as defined in claim 14 wherein said wheel slip circuit includes timing means for resetting the power control system to its normal operational state a predetermined time after said second switch means switches from said first to said second states if said wheel slip circuit is not earlier reset.

16. The system as defined in claim 7 wherein the traction vehicle includes a plurality of powered wheels, each of said powered wheels being mechanically connected to a corresponding alternating current electrical traction motor, each of said traction motors being connected to and powered by said power control system, and including:
   a. a plurality of rotational velocity sensing devices, each of said devices being operatively coupled to a corresponding one of said driven wheels whereby each of said devices produces a speed signal corresponding to the instantaneous rotational velocity of its associated wheel;
   b. means for summing said speed signals to produce a summed instantaneous velocity signal representative of the average velocity of said driven wheels; and
   c. means connecting said summed instantaneous velocity signal to said wheel slip circuit.

17. The system as defined in claim 7 wherein the traction vehicle includes a plurality of driven wheels, each of said driven wheels being mechanically connected to a corresponding alternating current electrical traction motor, each of said traction motors being connected to and powered by said power control system, and including:
   a. a plurality of rotational sensing devices, each of said devices being operatively coupled to a corresponding one of said driven wheels whereby each of said devices produces an instantaneous rotational velocity signal corresponding to the instantaneous velocity of its associated wheel; and
   b. a plurality of said wheel slip circuits, each of said wheel slip circuits being connected to receive an instantaneous rotational velocity signal from a corresponding one of said sensing devices and each of said wheel slip circuits being connected to modify selected parameters of said power control system.

18. A method for detecting slipping and sliding of a powered wheel on a tractive surface comprising the steps of:
   a. obtaining the value of the instantaneous rotational acceleration of the wheel;
   b. obtaining the value of the average rotational acceleration of the wheel;
   c. comparing the obtained values of instantaneous and average acceleration; and
   d. producing a wheel slip signal when the comparing step indicates that the instantaneous rotational acceleration deviates from the average acceleration by at least a predetermined acceleration margin.

19. The method as defined in claim 18 wherein the step of obtaining the value of the instantaneous rotational acceleration comprises the steps of:
   a. sensing the value of the instantaneous rotational velocity of the wheel; and d. differentiating the sensed value of the instantaneous rotational velocity to obtain the value of the instantaneous rotational acceleration.

20. The method as defined in claim 18 wherein the step of obtaining the value of the average rotational acceleration comprises the steps of:
   a. sensing the value of the instantaneous rotational velocity of the powered wheel;
   b. summing the values of first and second signals to derive a difference signal, said first signal being representative of the value of said sensed rotational velocity and said second signal being representative of the predicted rotational velocity of the wheel;
   c. integrating said difference signal to derive a third signal representative of the value of the average rotational acceleration; and
   d. integrating said third signal to derive said second signal.

21. The method as defined in claim 20 and including the further step of:
   e. interrupting said difference signal in response to said wheel slip signal whereby said value of average rotational acceleration is maintained constant for the duration of said wheel slip signal.

22. The method as defined in claim 21 and including the method of detecting a recovery from a wheel slipping and sliding condition comprising the further steps of:
   f. comparing said instantaneous rotational velocity to said predicted rotational velocity; and
   g. terminating said wheel slip signal when said last mentioned comparing step indicates that said instantaneous rotational velocity is within a predetermined margin of said predicted rotational velocity.

* * * * *

UNITED STATES PATENT OFFICE
CERTIFICATE OF CORRECTION

PATENT NO. : 4,075,538
DATED : Feb. 21, 1978
INVENTOR(S) : A. B. Plunkett

It is certified that error appears in the above-identified patent and that said Letters Patent are hereby corrected as shown below:

Column 18, line 53, "instantaneously" should be corrected to -- instantaneous --

Column 19, line 34, "actuator" should be corrected to -- actual --

Column 21, line 1, "d." should be corrected to -- b. --

Signed and Sealed this

Twentieth Day of June 1978

[SEAL]

Attest:

RUTH C. MASON
Attesting Officer

DONALD W. BANNER
Commissioner of Patents and Trademarks